US011733138B1

United States Patent
Bowers et al.

(10) Patent No.: US 11,733,138 B1
(45) Date of Patent: Aug. 22, 2023

(54) MULTI-DENSITY ARRAY CONTROLLER

(71) Applicant: Vega Americas, Inc., Cincinnati, OH (US)

(72) Inventors: Geoffrey Bowers, Loveland, OH (US); Eric Danielson, Norwood, OH (US); Christopher Hamilton Willoughby, Loveland, OH (US)

(73) Assignee: Vega Americas, Inc., Mason, OH (US)

( * ) Notice: Subject to any disclaimer, the term of this patent is extended or adjusted under 35 U.S.C. 154(b) by 167 days.

(21) Appl. No.: 17/144,759

(22) Filed: Jan. 8, 2021

(51) Int. Cl.
*G01N 9/24* (2006.01)
*G01F 23/288* (2006.01)

(52) U.S. Cl.
CPC ............ *G01N 9/24* (2013.01); *G01F 23/288* (2013.01)

(58) Field of Classification Search
None
See application file for complete search history.

(56) References Cited

U.S. PATENT DOCUMENTS

| 5,099,124 A | 3/1992 | Benson |
| 9,891,091 B2 | 2/2018 | Sanchez Galicia et al. |
| 2016/0177695 A1* | 6/2016 | Kupferschmid ......... G01N 9/24 137/560 |

FOREIGN PATENT DOCUMENTS

WO     WO-0022387 A1 *   4/2000  ............. B01D 17/00

* cited by examiner

*Primary Examiner* — Edwin C Gunberg
(74) *Attorney, Agent, or Firm* — Wood Herron & Evans LLP

(57) ABSTRACT

A disclosed system determines the elevation of an emulsion phase in a vessel. The system includes more than one source-detector pairs connected to the vessel and a computing device. Each of the source-detector pairs include a radioactive source and a radiometric detector, and are positioned at an elevation measured from the bottom of the vessel. The computing device is connected to the source-detector pairs, and is configured to identify the height of an emulsion phase using an upper boundary target density and a lower boundary target density. The height of the emulsion phase is identified by obtaining density readings from at least two of the source-detector pairs, calculating an upper boundary emulsion phase elevation and calculating a lower boundary emulsion phase elevation, each calculation using the density readings, and at least one of the upper boundary target density, and the lower boundary target density.

17 Claims, 7 Drawing Sheets

MULTI-DENSITY ARRAY CONTROLLER

FIELD OF THE INVENTION

This disclosure generally relates to systems and methods for performing liquid phase boundary measurements of a volume of material in a container.

BACKGROUND OF THE INVENTION

Certain industrial processes (e.g., oil production, gas production, bitumen processing, oil refining) leverage the use of large containers (i.e., vessels) that often hold various materials. It is typical for these materials to create emulsion layers (a mixture of the materials) that can be considered boundaries (i.e., interfaces) between the materials.

For example, in oil refining, the oil-water interface is a common emulsion layer. A vessel here typically contains a large emulsion layer without having that layer approach outlet streams of pure water or oil. Further, in many vessels an electrostatic grid is used to force oil-water separation. When the electrostatic grid is used, operators must keep the emulsion layer below the electrostatic grid to prevent shorting. For at least these reasons, efficient operation requires accurate measurement of any liquid phase boundary.

Density measurements taken by nuclear density gauges have developed as a customary way to identify the boundaries between the materials in a vessel. U.S. Pat. No. 7,986,766 (Cahill), incorporated herein by reference, describes nuclear density gauges in detail. Conventionally, the density measurements have been transmitted as density signals (e.g., current output) to a control system and subsequently represented visually to an operator. The operator would then use the visual depiction in an attempt to determine the location of the emulsion layer.

Traditional automatic controllers need a singular feedback parameter to compare to a control setpoint. Examples include singular temperature, pressure, flow rate, pH, density, or level. The necessity of employing multiple nuclear density gauges to identify phase boundaries, each with their own singular feedback parameter, renders the use of traditional automatic controllers not feasible.

Recently, efforts have been made to automate this process in order to remove the burden on the operator of having to identify the location of the emulsion layer. For example, in U.S. Pat. No. 10,030,498 (Kupferschmid et al.), the oil-water interface layer is adjusted based upon a comparison between the density measurements that are taken and previously calibrated density setpoints. This approaches leverages the existing density signals, but introduces a calibration aspect that must be maintained across a range of setpoints for every density measurement made.

In U.S. Pat. No. 9,891,091 (Sanchez Galicia et al.), a method of determining the location of a boundary between two phases within a vessel is presented. Here, each detector measures across a range (i.e., detector stage). A boundary is first identified to fall within a particular detector stage based on the detected radiation. Afterwards, the detected radiation is compared with known, previously calibrated, values that reflect when the phase boundary is at the top and bottom of the detector stage to determine the location of the boundary within the detector stage. This method also introduces a calibration aspect, in addition to requiring detectors to be uninterrupted or risk not being able to identify a boundary that exists within a gap between detectors. Further, this method measures density across elongated detectors, thereby introducing noise into a density measurement and lacking the precision that can be made available by using point detectors.

Considering the limitations, lack of precision, and added complexity of the aforementioned methods, a need exists for a more limitless, precise and simplistic system and method that can process density measurements to be used for depiction and automatic control of an emulsion layer in a vessel.

SUMMARY OF THE INVENTION

The present invention employs a highly sensitive density measurement system for associating density measurements with precise point elevations. These density measurements and elevations are then leveraged in a novel way to identify the boundaries of an emulsion phase in a vessel. With this, the present invention enables various new systems and methods that satisfy the need for a more limitless, precise and simplistic way to process density measurements for depiction and automatic control of an emulsion phase in a vessel.

The systems and methods include a density measurement system that has more than one source-detector pair and is connected to a vessel. Each of the source-detector pairs include a radioactive source and a radiometric detector and are positioned at an elevation that is measured from the bottom of the vessel. Further, a computing device is also included that communicates to the source-detector pairs. The computing device is able to identify the height of an emulsion phase by (1) obtaining density readings from at least two of the source-detector pairs, (2) calculating an upper boundary emulsion phase elevation using the density readings, and at least one of an upper boundary target density and a lower boundary target density, and (3) calculating a lower boundary emulsion phase elevation using the density readings, and at least one of the upper boundary target density and the lower boundary target density.

With the height of the emulsion phase identified, additional information regarding the matters bordering the emulsion phase can also be identified. All of this information, which can be viewed as simplifying the information stemming from many measurement signals into just a few signals, enables control loop functionality for control of the emulsion phase. The control loop functionality being previously unattainable due to the limitations in interfacing multiple control loop signals (e.g., a 4-20 mA current loop for each radioactive source and radiometric detector in a sensor measurement system) with an automatic controller of a control system.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

In the preceding and following sections, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

These embodiments are described in sufficient detail to enable those skilled in the art to practice the invention, and it is understood that other embodiments may be utilized, and that logical structural or mechanical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
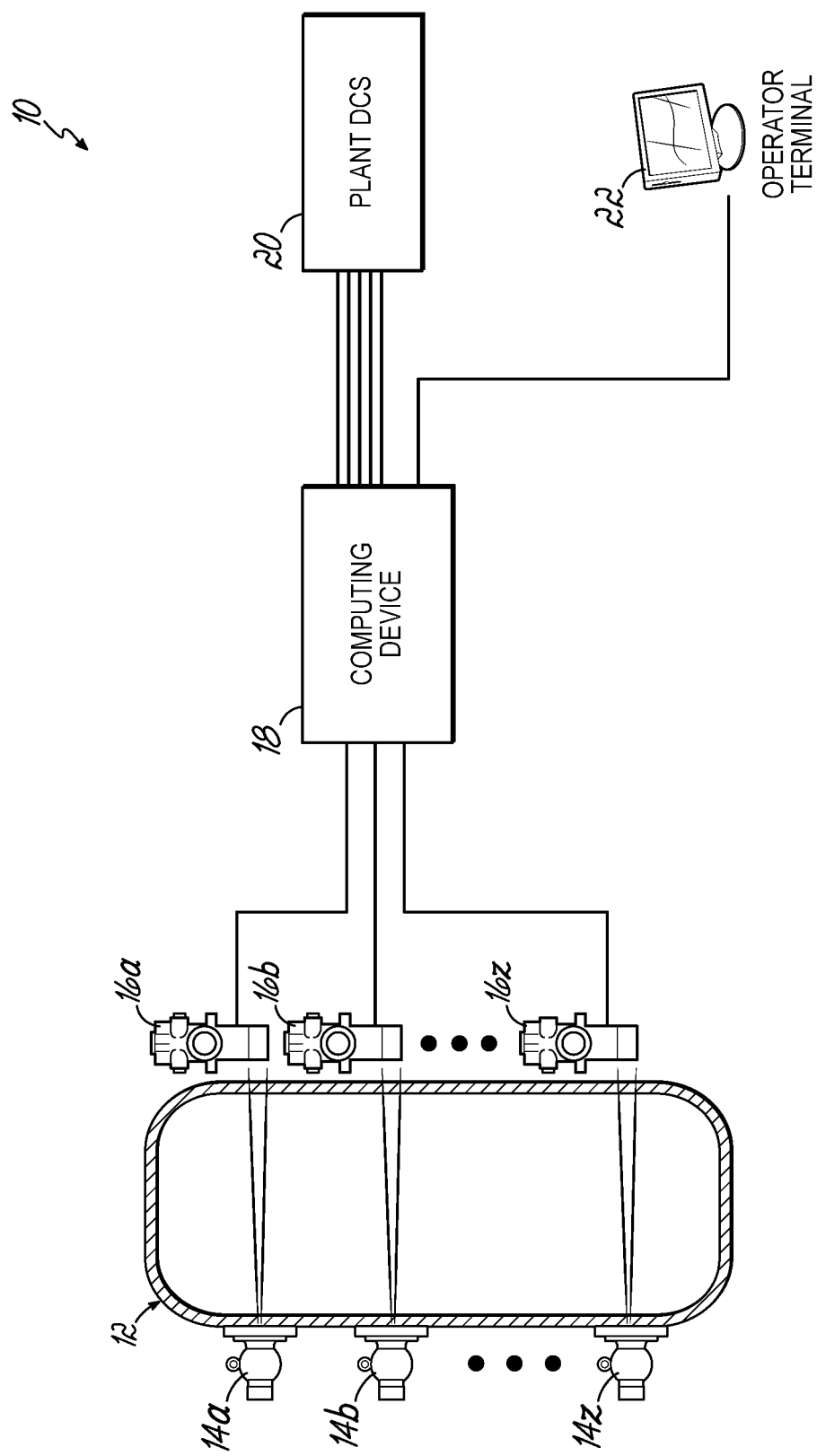
FIG. 1 is a schematic view of an embodiment of an industrial control system for measuring and controlling an emulsion phase in a vessel.

FIG. 1 is a schematic view of an embodiment of an industrial control system (ICS) 10 for measuring and controlling an emulsion phase (not shown) in a vessel 12 that contains a first matter phase (not shown) and a second matter phase (not shown). As shown in the current embodiment, the ICS (10) generally comprises a vessel 12, a plurality of radioactive sources 14a-14z, a plurality of radiometric detectors 16a-16z, a computing device 18, a distributed control system 20, and an operator terminal 22. The vessel 12 may be any type of container that can be used in industrial processes such as oil/gas production, bitumen processing, or oil refining, or any container that is capable of storing liquids or bulk solids.

The radioactive sources 14a-14z may be radioactive isotopes (e.g., Caesium-137, Cobalt-60) in suitable source containers. Examples of these include the SH-F series source holder and the SHLD-1 series source holder from VEGA Grieshaber KG (https://www.vega.com/en-us/products/product-catalog/switching/radiation-based/shf, https://www.vega.com/en-us/products/product-catalog/switching/radiation-based/shld1). The radiometric detectors 16a-16z may be radiometric sensors that are capable of density measurement. Examples include the MINITRAC 31 and MINITRAC 32 from VEGA Grieshaber KG (https://www.vega.com/en-us/products/product-catalog/switching/radiation-based/minitrac-31, https://www.vega.com/en-us/products/product-catalog/switching/radiation-based/minitrac-32). Each of the plurality of radioactive sources 14a-14z and the plurality of radiometric detectors 16a-16z are positioned externally to the vessel 12, at matching elevations. In alternative embodiments, the plurality of radioactive sources 14a-14z may be positioned in a drywell inside the vessel 12. In the current embodiment the elevations are measured from the bottom of the vessel 12, but other embodiments may measure the elevations from a different point of reference. One of each of the plurality of radioactive sources 14a-14z and the plurality of radiometric detectors 16a-16z function together as a source-detector pair, creating a plurality of source-detector pairs, collectively referred to as SDPs. The SDPs range from $SDP_n$ to $SDP_z$, where $SDP_n$ is the source-detector pair at the topmost elevation and $SDP_z$ is the source-detector pair at the bottommost elevation. Each SDP is isolated with collimator hardware at the radiometric detector to prevent measurement crosstalk.

In an embodiment of the invention, the vessel 12 may be configured with additional sensors, such as those capable of capturing level measurement (i.e., residue detection) signals. A separate MINITRAC 31 may be configured for this type of signal detection. These level measurement signals may be utilized, for example, to measure the solid thickness at the bottom of the vessel 12 or measure the liquid/gas phase interface elevation at the top of the vessel 12.

In the current embodiment, the computing device 18 may be a specially programmed controller, such as a programmable logic controller. The embodiment may include the associated hardware required for periphery communication (e.g., input/output signal termination blocks, relay output module, ethernet switch, fiber-optic connection, power supply) to be enabled. The computing device 18 may be supplied in an industrial enclosure in some embodiments, while other embodiments utilize a backplane for installation of the computing device 18 in a separately supplied enclosure.

The industrial control system 10 may include an optional connection to a distributed control system 20. The distributed control system 20 may be a larger control system designed to tie in multiple localized or discrete control system (e.g., industrial control system 10). An example of the distributed control system 20 is a plant-wide control system.

The operator terminal 22 may be a single terminal (e.g., a plant workstation), a remote terminal connected via a network connection (e.g., a service PC), or multiple configurations of terminals both local and remote to the computing device 18. The operator terminal 22 allows a user to view information—through an HTML page, for example—stemming from the computing device 18 and the distributed control system 20. FIGS. 5-8, discussed below, present this example. Further, the operator terminal 22 may provide a user with a means, such as an HTML page, for controlling and/or configuring the computing device 18 to control the level of the emulsion phase, such as by allowing the manipulation of certain controlling parameters (described below).

In an embodiment of the invention, the upper boundary target density, the lower boundary target density, the density reading from each of the source-detector pairs, the upper boundary emulsion phase elevation, and the lower boundary emulsion phase elevation may be considered controlling parameters. In another embodiment, the controlling parameters may also include the one or more level measurement signals and the one or more calculated outputs. The computing device 18 may output at least one of these controlling parameters, along with the emulsion phase, the first matter phase, and the second matter phase to the distributed control system 20, the operator terminal 22, or an automatic controller (not shown). For an automatic controller, the controlling parameter can serve as a feedback in order to control a setpoint. For example, the lower boundary emulsion phase elevation may be used with a level controller to open or close a valve to control a water level setpoint in the vessel 12.

In further embodiments, the industrial control system 10 may include a plurality of relay outputs used for alarming on a plurality of alarm conditions. Examples of alarm conditions include electromagnetic radiation interference, communication faults, and radiometric detector faults.

Importantly, the computing device 18 is capable of communicating with SDPs, the distributed control system 20, and the operator terminal 22. In some embodiments the communication may be achieved using analog connections, such as 4-20 mA current loops. Other embodiments may leverage a digital connection, such as Modbus TCP/IP or Modbus RS485, to communicate. Still, additional embodiments may utilize a combination of the above communication methods. In the current embodiment, the computing device 18 is using 4-20 mA current loops to communicate with both the SDPs and the distributed control system 20, while using HTML to communicate with the operator terminal 22. For the SDPs, each of the plurality of radiometric detector 16a-16z utilize respective 4-20 mA current loops. In an embodiment utilizing level measurement signals, a 4-20 mA current loop may also be used for each level measurement signal from the vessel 12 to the computing device 18. Additionally, the computing device 18 may also retransmit the values stemming from analog connections along digital connections.

The computing device 18 is configured to be able to process the method for deriving the elevation of an emulsion phase in the vessel 12. In one embodiment, the method uses an upper boundary target density, a lower boundary target density, and obtained density readings from at least two of the SDPs to calculate an upper boundary emulsion phase elevation and a lower boundary emulsion phase elevation. The upper boundary emulsion phase elevation and the lower boundary emulsion phase elevation serve as the respective boundaries to identify the height of the emulsion phase.

In one embodiment, the upper boundary target density and the lower boundary target density are manually set by a user. This may be done via an interface on the operator terminal 22. In another embodiment, the upper boundary target density and the lower boundary target density are automatically calculated by the computing device 18. In yet another embodiment, both the manual and automatic options for setting the upper boundary target density and the lower boundary target density may be available. Automatic calculations are discussed further with FIG. 2 below.

In another embodiment, the computing device 18 may process calculated outputs, such as the thickness of the emulsion phase or the calculation of the average height of the first matter phase or the second matter phase. To state in a different way, where oil and water are the first matter phase and the second matter phase, the average height of the oil or water could be calculated. An additional calculated output may be the concentration of a matter in the vessel 12. For example, the concentration of water if water were the first matter phase or the second matter phase.

Figure 2:
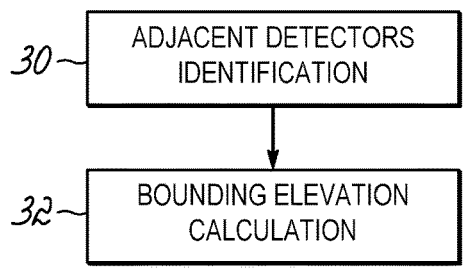
FIG. 2 is a flowchart illustrating the two key concepts of the method executed by the industrial control system of FIG. 1.

FIG. 2 is a flowchart illustrating the two key concepts of the method executed by the industrial control system of FIG. 1 for measuring and controlling the emulsion phase in the vessel 12. The method differs slightly based on which emulsion phase boundary is being measured. The differences are discussed here with FIG. 2, along with FIGS. 3 and 4 below.

Step 30 involves identifying an adjacent pair of source-detector pairs, an above target density source-detector pair and a below target density source-detector pair, for each emulsion phase boundary. In the current embodiment, step 30 requires a target density for each emulsion phase boundary, the upper boundary target density and the lower boundary target density. Both densities may be manually set or automatically calculated. These densities serve to define two boundary densities, that between the first matter phase and the emulsion phase and that between the second matter phase and the emulsion phase. For example, in a vessel 12 with water (density=1) and oil (density=0.9), the upper boundary target density (i.e., the oil-emulsion interface, the top of the emulsion) may be manually set to 0.94 and the lower boundary target density (i.e., the water-emulsion interface, the bottom of the emulsion) may be manually set to 0.97.

Automatic calculation of the upper boundary target density and the lower boundary target density is better suited for conditions where the first matter phase and the second matter phase vary in density. Under these conditions, the density of the first matter phase may become greater than the upper boundary target density and the density of the second matter phase may become less than the lower boundary target density.

The automatic calculations, a distinct calculation for each target density, allow for the target densities to be calculated based on actual fluid density of both the first matter phase and the second matter phase. The calculations use a fixed offset percentage as well as density measurements from the uppermost SDP ($SDP_a$) and the lowermost SDP ($SDP_z$). The fixed offset percentage may be set between 1% and 50%.

The calculation may be performed continuously, such as with every computation cycle, or may be performed at varying intervals.

For the upper boundary target density, the automatic calculation may be completed by: (1) identifying the uppermost SDP, (2) identifying the lowermost SDP, (3) multiplying the difference between the density reading of the uppermost SDP and the density reading of the lowermost SDP by an upper boundary offset percentage (e.g., 0.20), and (4) adding the product of the multiplication to the density reading of the uppermost SDP.

For the lower boundary target density, the automatic calculation may be completed by: (1) identifying the uppermost SDP, (2) identifying the lowermost SDP, (3) multiplying the difference between the density reading of the uppermost SDP and the density reading of the lowermost SDP by a lower boundary offset percentage (e.g., 0.10), and (4) subtracting the product of the multiplication from the density reading of the lowermost SDP.

As an example, for an uppermost SDP density reading of 0.8 and a lowermost SDP density reading of 1.0, the automatically calculated target densities would be:

Upper Boundary Target Density=0.8+0.2(1.0−0.8)
=0.84

Lower Boundary Target Density=1.0−0.1(1.0−0.8)
=0.98

With the target densities for each emulsion phase boundary identified, the SDPs are then sequentially reviewed for each emulsion phase boundary. At each SDP, the density measurement obtained from the SDP is compared with that of the associated target density. Depending on the comparison, which is distinct for each emulsion phase boundary and is described with FIGS. 3 and 4 below, the sequential review may cease and the method may continue on to step 32. When moving on to step 32, the SDP where the sequential review ceased and either the previous or next (the selection based on which emulsion phase boundary is being measured) SDP are identified as the adjacent pair of source-detector pairs. Certain scenarios, such as when the upper emulsion phase boundary is at the top of the vessel 12 or when the lower emulsion phase boundary is at the bottom of the vessel 12, necessitate that only one SDP, the current SDP being sequentially reviewed, be utilized in step 32.

Figure 3:
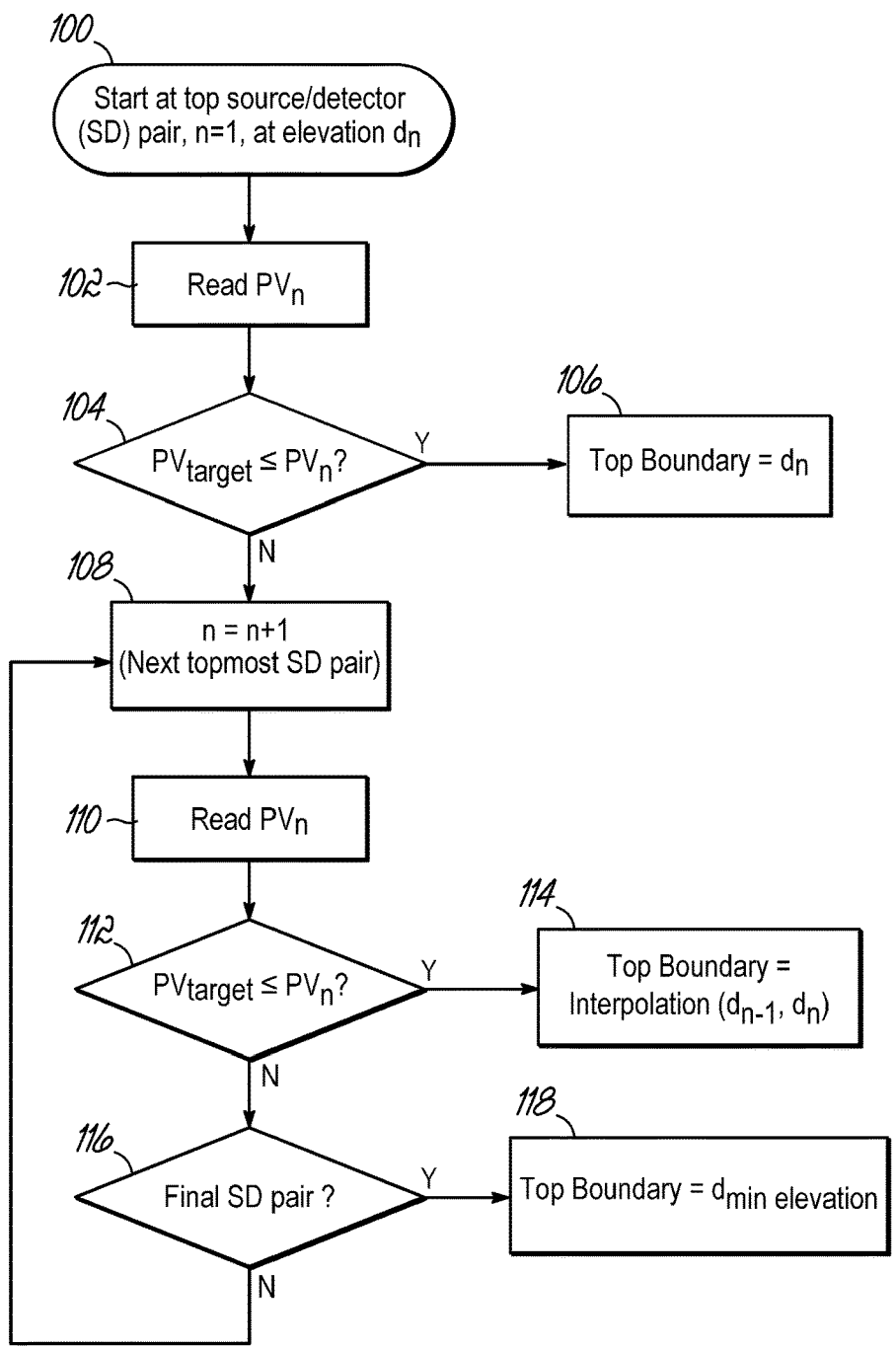
FIG. 3 is a flowchart detailing the method executed by the computing device of the industrial control system of FIG. 1 to calculate the upper boundary of an emulsion phase.
Figure 4:
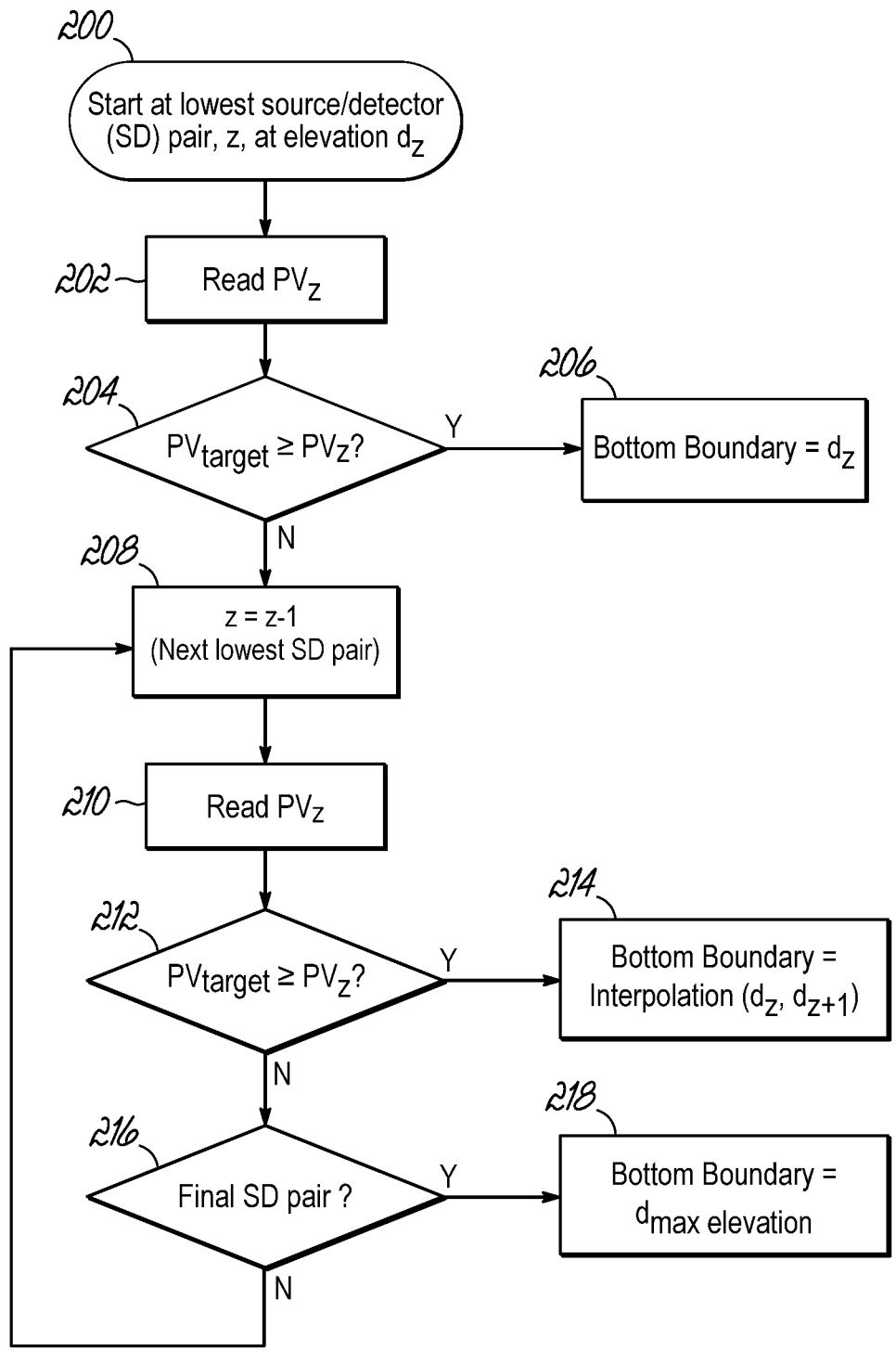
FIG. 4 is a flowchart detailing the method executed by the computing device of the industrial control system of FIG. 1 to calculate the lower boundary of an emulsion phase.
Figure 5:
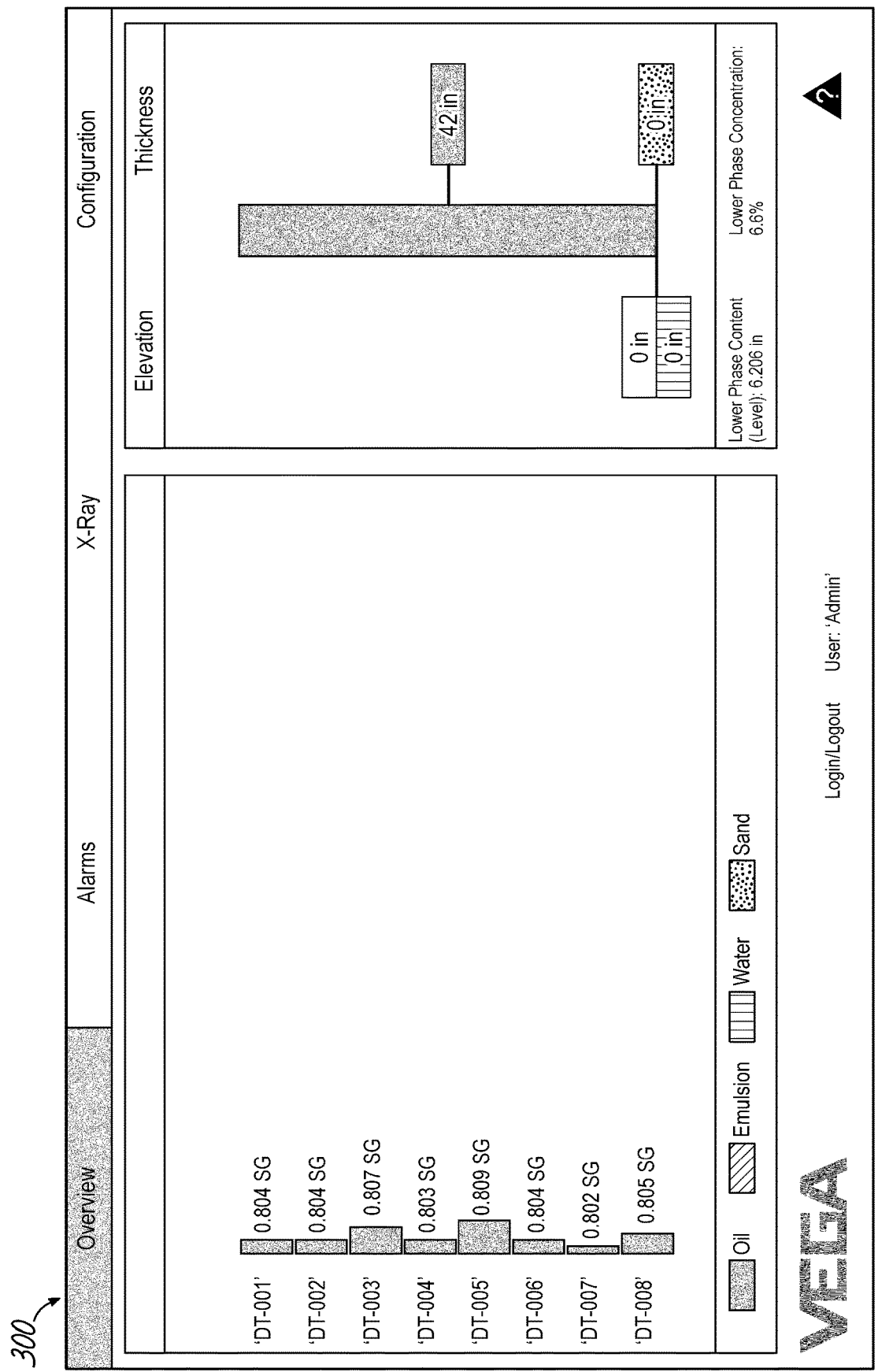
FIGS. 5-8 illustrate views of an operator terminal displaying the density readings (left side of views) for an array of source-detector pairs along with the elevations and thicknesses (right side of views) of different phases in a vessel, both the density readings and the elevations stemming from the industrial control system of FIG. 1.
Figure 6:
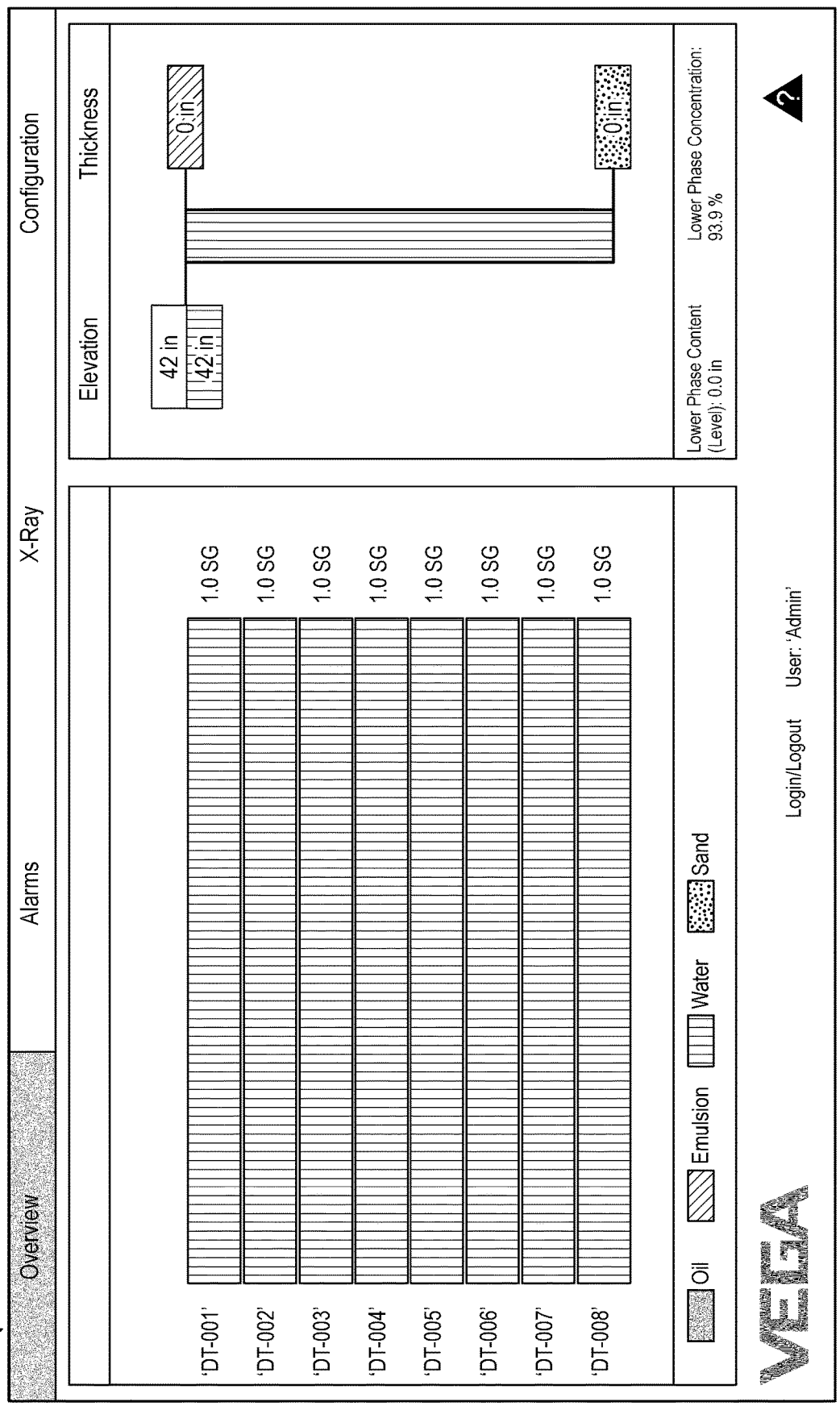
Figure 7:
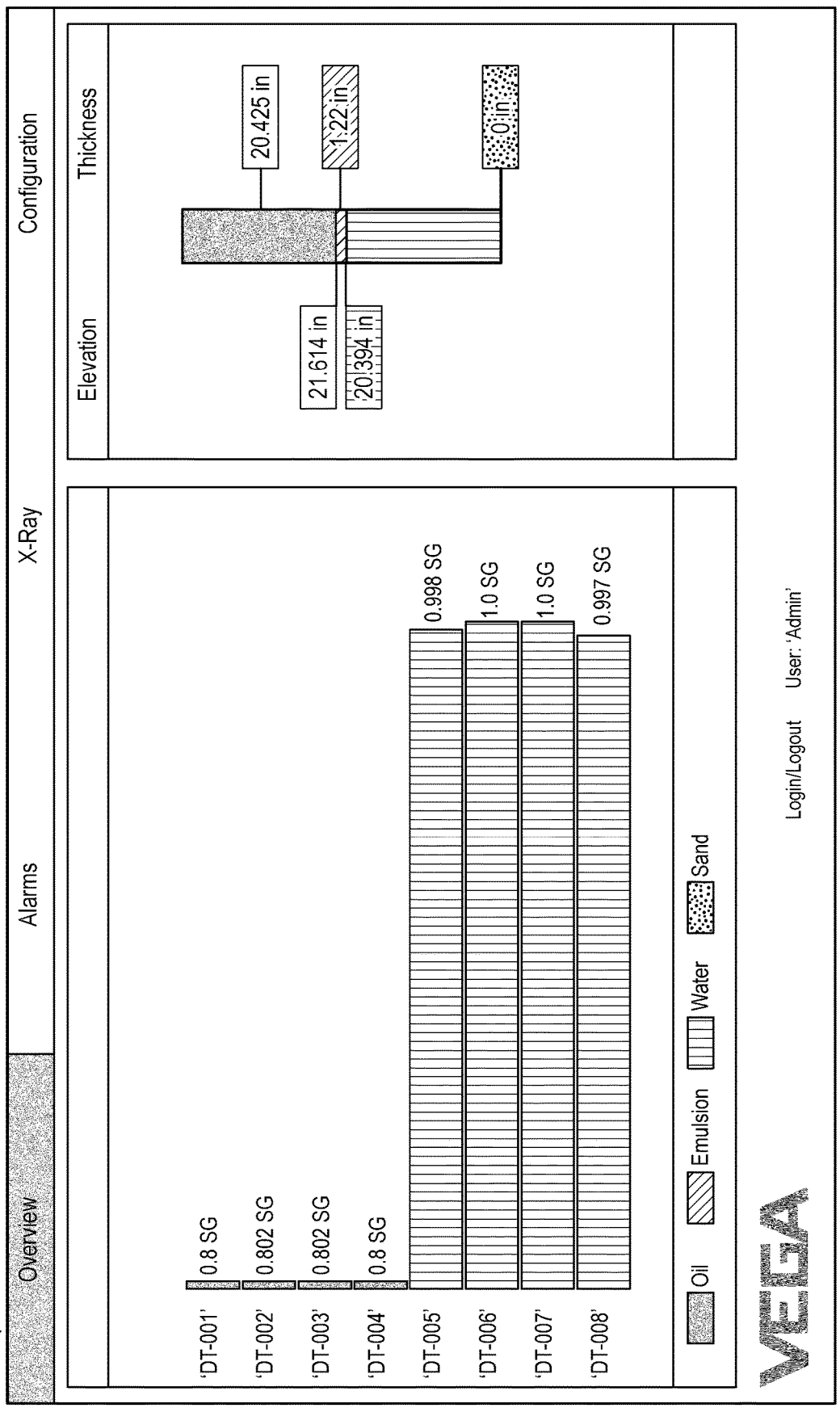
Figure 8:
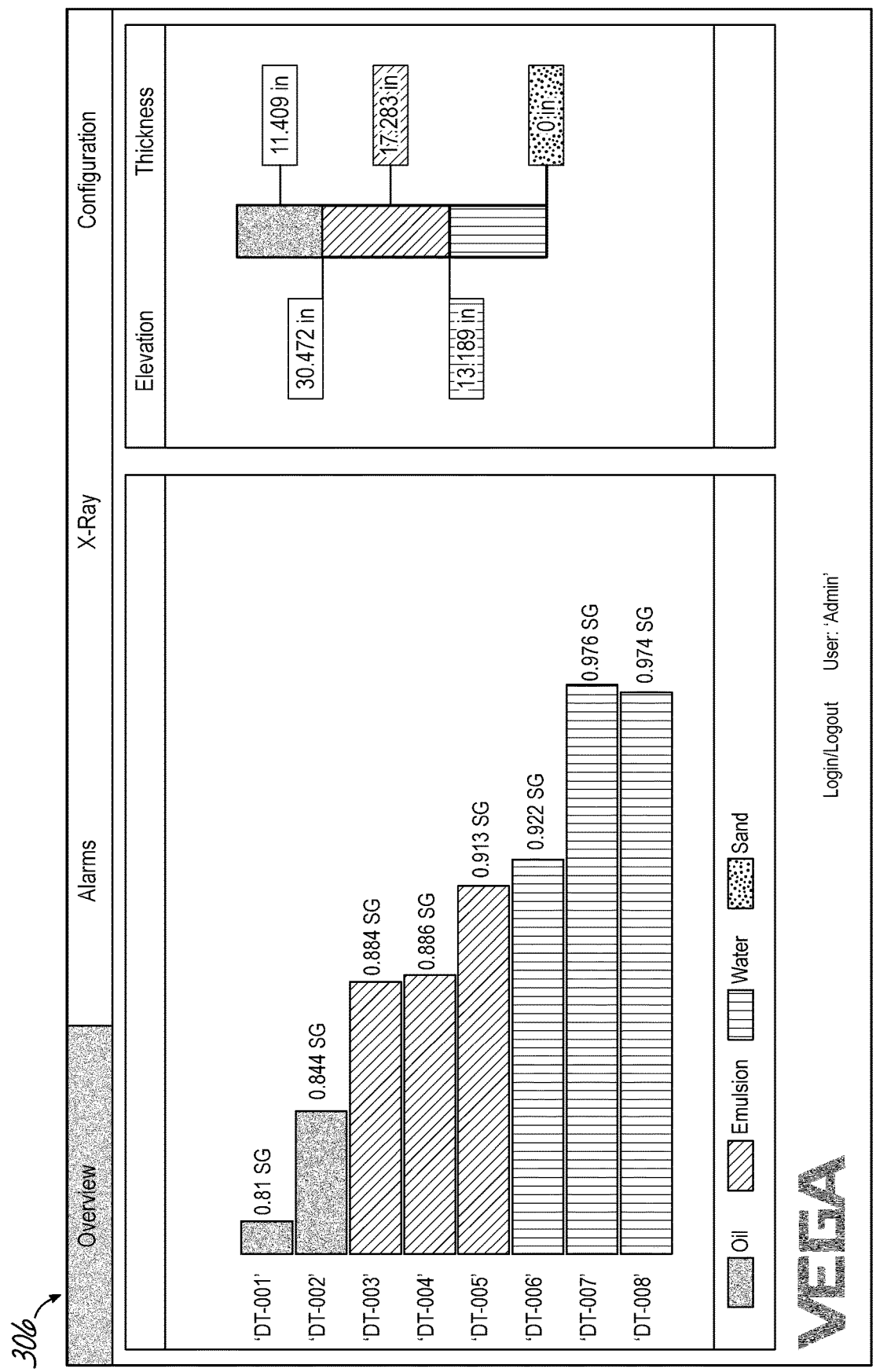

In step 32 the boundary elevations of the emulsion phase are calculated. The calculation, distinct for each emulsion phase boundary, is primarily an interpolation based on the measured densities of the adjacent pair of source-detector pairs, the associated target density, and the elevations of each of the adjacent pair of source-detector pairs. FIGS. 3 & 4, discussed below, provide a more detailed description of the calculation. In the scenarios where the boundary elevations are at the top or bottom of the vessel, the calculation is reduced to equating the boundary elevation to the respective elevation of the SDP that was currently being sequentially reviewed in step 30. In an embodiment of the invention, the boundary elevations may utilized collectively to identify the thickness of the emulsion phase. For example, the difference between the elevation of each emulsion phase boundary can be viewed as the thickness of the emulsion phase. Additionally, the boundary elevations may be used along with other measurements (e.g., elevations from the SDPs, level measurements, known measurements of the vessel 12) to identify the thicknesses of the first matter phase and the second matter phase.

FIG. 3 is a flowchart detailing the method executed by the computing device of the industrial control system of FIG. 1 to calculate the upper boundary of an emulsion phase. Step 100 begins the sequential review of the SDPs discussed in step 30 of FIG. 2. For the upper boundary of the emulsion phase, the calculation begins the sequential review of the SDPs at the highest SDP, $SDP_n$ at a known elevation $d_n$.

In step 102, a measurement is taken for the density at $SDP_n$, $PV_n$.

In step 104, $PV_n$ is compared with the upper boundary target density, $PV_{upper\_target}$. If $PV_{upper\_target}$ is less than or equal to $PV_n$, the upper boundary has been located and the next step is step 106. If $PV_{upper\_target}$ is greater than $PV_n$, the upper boundary has not been located and the next step is step 108.

In step 106, the upper boundary of the emulsion phase is set to a maximum elevation. The maximum elevation may be $d_n$, the top of the vessel 12, the elevation of the bottom of a gas or air layer as measured by a level measurement signal, or some other elevation in the vessel 12 deemed to be maximum.

In step 108, the method proceeds to the next highest $SDP_n$, where n=n+1.

In step 110, a measurement is taken for the density at $SDP_n$, $PV_n$.

In step 112, $PV_n$ is compared with $PV_{upper\_target}$. If $PV_{upper\_target}$ is less than or equal to $PV_n$, the upper boundary is to be interpolated and the next step is step 114. If $PV_{upper\_target}$ is greater than $PV_n$, the next step is step 116.

In step 114, the interpolation of the upper boundary is calculated by:

Identifying $SDP_{n-1}$ as one of the adjacent pair of source-detector pairs. $PV_{n-1}$ being the density measurement that is closest in value or equal to, but is not more than, $PV_{upper\_target}$ and $d_{n-1}$ being the known elevation at $SDP_{n-1}$.

Identifying $SDP_n$ as the other of the adjacent pair of source-detector pairs. $PV_n$ being the density measurement that is closest in value or equal to, but is not less than, $PV_{upper\_target}$ and $d_n$ being the known elevation at $SDP_n$.

Calculating a percentage offset, the percentage offset defined as:

$$(PV_{upper\_target}-PV_{n-1})/(PV_n-PV_{n-1})$$

Multiplying the percentage offset by $(d_{n-1}-d_n)$.

Adding $d_n$ to the product of the multiplication.

In step 116, it is determined whether $SDP_n$ is the final SDP of the sequential review. If so, the upper boundary has been located and the next step is 118. If not, the next step is 108.

In step 118, the upper boundary of the emulsion phase is set to a minimum elevation. The minimum elevation may be $d_n$, the bottom of the vessel 12, the elevation of the top of a sediment or residue layer as measured by a level measurement signal, or some other elevation in the vessel 12 deemed to be minimum.

FIG. 4 is a flowchart detailing the method executed by the computing device of the industrial control system of FIG. 1 to calculate the lower boundary of an emulsion phase. Step 200 begins the sequential review of the SDPs discussed in step 30 of FIG. 2. For the lower boundary of the emulsion phase, the calculation begins the sequential review of the SDPs at the lowest SDP, $SDP_z$ at a known elevation $d_z$.

In step 202, a measurement is taken for the density at $SDP_z$, $PV_z$.

In step 204, $PV_z$ is compared with the lower boundary target density, $PV_{lower\_target}$. If $PV_{lower\_target}$ is greater than or equal to $PV_z$, the lower boundary has been located and the next step is step 206. If $PV_{lower\_target}$ is less than $PV_z$, the lower boundary has not been located and the next step is step 208.

In step 206, the lower boundary of the emulsion phase is set to a minimum elevation. The minimum elevation may be $d_z$, the bottom of the vessel 12, the elevation of the top of a sediment or residue layer as measured by a level measurement signal, or some other elevation in the vessel 12 deemed to be minimum.

In step 208, the method proceeds to the next lowest $SDP_z$, where $z=z-1$.

In step 210, a measurement is taken for the density at $SDP_z$, $PV_z$.

In step 212, $PV_z$ is compared with the lower boundary target density, $PV_{lower\_target}$. If $PV_{lower\_target}$ is greater than or equal to $PV_z$, the lower boundary is to be interpolated and the next step is step 214. If $PV_{lower\_target}$ is less than $PV_z$, the next step is step 216.

In step 214, the interpolation of the lower boundary is calculated by:

Identifying $SDP_z$ as one of the adjacent pair of source-detector pairs. $PV_z$ being the density measurement that is closest in value or equal to, but is not more than, $PV_{lower\_target}$ and $d_z$ being the known elevation at $SDP_z$.

Identifying $SDP_{z+1}$ as the other of the adjacent pair of source-detector pairs. $PV_{z+1}$ being the density measurement that is closest in value or equal to, but is not less than, $PV_{lower\_target}$ and $d_{z+1}$ being the known elevation at $SDP_{z+1}$.

Calculating a percentage offset, the percentage offset defined as:

$$(PV_{lower\_target} - PV_z)/(PV_{z+1} - PV_z)$$

Multiplying the percentage offset by $(d_z - d_{z+1})$.
Adding $d_{z+1}$ to the product of the multiplication.

In step 216, it is determined whether $SDP_z$ is the final SDP of the sequential review. If so, the lower boundary has been located and the next step is 218. If not, the next step is 208.

In step 218, the lower boundary of the of the emulsion phase is set to a maximum elevation. The maximum elevation may be $d_z$, the top of the vessel 12, the elevation of the bottom of a gas or air layer as measured by a level measurement signal, or some other elevation in the vessel 12 deemed to be maximum.

FIGS. 5-8 illustrate views of an operator terminal displaying the density readings (left side of views) for an array of source-detector pairs along with the elevations and thicknesses (right side of views) of different phases in a vessel, both the density readings and the elevations stemming from the industrial control system of FIG. 1. For clarity in explanation, the illustrations characterize an industrial control system 10 with an 8-pair source-detector pair array as the SDPs. The configuration data (also known as a configuration profile) for the current embodiment is as follows:

Source-Detector Pair 1 Elevation—42"
Source-Detector Pair 2 Elevation—36"
Source-Detector Pair 3 Elevation—30"
Source-Detector Pair 4 Elevation—24"
Source-Detector Pair 5 Elevation—18"
Source-Detector Pair 6 Elevation—12"
Source-Detector Pair 7 Elevation—6"
Source-Detector Pair 8 Elevation—0"
Oil Target Density—0.88
Water Target Density—0.92

Additionally, the phases depicted in FIGS. 5-8 are oil, emulsion, and water. The emulsion phase is defined as the area displayed below the upper boundary emulsion phase elevation and above the lower boundary emulsion phase elevation. Next, the first matter phase (here, the oil phase) is defined as the area displayed above the upper boundary emulsion phase elevation. Lastly, the second matter phase (here, the water phase) is defined as the area displayed below the lower boundary emulsion phase elevation.

View 300 depicts the density readings, phase elevations, and phase thickness as they would appear if the vessel 12 contained solely an oil phase. Here, the industrial control system 10 did not find an SDP with a density measurement greater than the Oil Target Density, so oil is displayed as having a 0 in bottom elevation and a thickness of 42 in, the elevation of the highest SDP. Similarly, the industrial control system 10 found the lowest SDP, $SDP_8$, have a density measurement less than the Water Target Density, so water is displayed as having a 0" top elevation.

View 302 depicts the density readings, phase elevations, and phase thickness as they would appear if the vessel 12 contained solely a water phase. Here, the industrial control system 10 found the highest SDP, $SDP_1$ have a density measurement greater than the Oil Target Density, so oil is displayed as having a 42" bottom elevation. Similarly, the industrial control system 10 does not find a density measurement less than the Water Target Density, so the water is displayed as having a 42" top elevation, the elevation of the highest SDP. In this scenario, 42 in may also be viewed as the thickness of the water.

View 304 depicts the density readings, phase elevations, and phase thickness as they would appear if the vessel 12 contained an oil phase, a water phase, and a negligible emulsion phase. In other words, there is a "clean" interface between the oil phase and the water phase. In this scenario, the industrial control system 10 found $SDP_5$ as the highest SDP with a density measurement greater than the Oil Target Density. Therefore, for the upper boundary of the emulsion phase calculation, $SDP_4$ and $SDP_5$ are identified as the adjacent SDP pairs and their respective density measurements (0.8, 0.998) and elevations (24 in, 18 in) yield a bottom elevation for oil of 21.614 in. Similarly, for the lower boundary of the emulsion phase calculation, $SDP_4$ and $SDP_5$ are also identified as the adjacent SDP pairs, yielding a top elevation for water of 20.394 in. Here, the oil is displayed having a thickness of 20.425 in, and the water a thickness of 20.394 in. The small emulsion phase in this scenario, 1.181 in, is attributed to the Oil Target Density and Water Target Density being slightly different.

View 306 depicts the density readings, phase elevations, and phase thickness as they would appear if the vessel 12 contained an oil phase, an emulsion phase, and a water phase. In this scenario, the industrial control system 10 found $SDP_3$ as the highest SDP with a density measurement greater than the Oil Target Density. Therefore, for the upper boundary of the emulsion phase calculation, $SDP_2$ and $SDP_3$ are identified as the adjacent SDP pairs and their respective density measurements (0.844, 0.884) and elevations (36 in, 30 in) yield a bottom elevation for oil of 30.472 in. Similarly, for the lower boundary of the emulsion phase calculation, $SDP_5$ and $SDP_6$ are identified as the adjacent SDP pairs and their respective density measurements (0.913, 0.922) and elevations (18 in, 12 in) yield a top elevation for water of 13.189 in. Here, the oil is displayed having a thickness of 11.409 in, the emulsion phase a thickness of 17.283 in, and the water phase a thickness of 13.189 in.

References in this specification to "one embodiment," "an embodiment," an "example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one of ordinary skill in the relevant art to affect such feature, structure, or characteristic in connection with other embodiments whether or not explicitly described.

The above detailed description refers to the accompanying drawings that illustrate exemplary embodiments. Other embodiments are possible, and modifications may be made to the embodiments within the spirit and scope of this description. Those of ordinary skill in the relevant art with access to the teachings provided herein will recognize additional modifications, applications, and embodiments within the scope thereof and additional fields in which embodiments would be of significant utility. Therefore, the detailed description is not meant to limit the embodiments described below.

Embodiments of the invention may include components that are implemented in hardware, firmware, software, or any combination thereof. Embodiments may also be implemented as instructions stored on a non-transitory machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

Embodiments may be implemented using software, hardware, and/or operating system implementations other than those described herein. Any software, hardware, and operating system implementations suitable for performing the functions described herein can be utilized.

Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the invention that others can, by applying knowledge of those of ordinary skill in the art, readily modify and/or adapt for various applications such specific embodiments, without undue experimentation, without departing from the general concept of embodiments of the invention. Therefore, such adaptation and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the invention should not be limited by any of the above-described example embodiments but should be defined only in accordance with the following claims and their equivalents.

What is claimed is:

1. A system for determining the elevation of an emulsion phase in a vessel that contains a first matter phase and a second matter phase, the system comprising:
    a plurality of source-detector pairs operatively connected to the vessel, each of the source-detector pairs comprising a radioactive source and a radiometric detector, wherein each of the source-detector pairs is positioned at an elevation measured from the bottom of the vessel;
    a computing device communicatively coupled to the plurality of source-detector pairs, the computing device configured to identify the height of an emulsion phase using an upper boundary target density and a lower boundary target density by the steps of:
        obtaining density readings from at least two of the source-detector pairs;
        calculating an upper boundary emulsion phase elevation from said density readings, and at least one of the upper boundary target density and the lower boundary target density; and
        calculating a lower boundary emulsion phase elevation from said density readings, and at least one of the upper boundary target density and the lower boundary target density,
    wherein the upper boundary emulsion phase elevation is calculated by:
        identifying an above target density source-detector pair from the plurality of source-detector pairs, the above target density source-detector pair producing an above target density reading that is the density reading from the plurality of source-detector pairs that is closest in value or equal to, but is not more than, the upper boundary target density;
        identifying a below target density source-detector pair from the plurality of source-detector pairs, the below target density source-detector pair producing a below target density reading that is the density reading from the plurality of source-detector pairs that is closest in value or equal to, but is not less than, the upper boundary target density;
        calculating a percentage offset, the percentage offset defined as the ratio between (1) and (2), where (1) is the difference between the upper boundary target density and the above target density reading and (2) is the difference between the below target density reading and the above target density reading;
        multiplying the percentage offset by the difference between the elevation of the above target density source-detector pair and the elevation of the below target density source-detector pair; and
        adding the elevation of the below target density source-detector pair to the product of the multiplication.

2. A system for determining the elevation of an emulsion phase in a vessel that contains a first matter phase and a second matter phase, the system comprising:
    a plurality of source-detector pairs operatively connected to the vessel, each of the source-detector pairs comprising a radioactive source and a radiometric detector, wherein each of the source-detector pairs is positioned at an elevation measured from the bottom of the vessel;

a computing device communicatively coupled to the plurality of source-detector pairs, the computing device configured to identify the height of an emulsion phase using an upper boundary target density and a lower boundary target density by the steps of:
   obtaining density readings from at least two of the source-detector pairs;
   calculating an upper boundary emulsion phase elevation from said density readings, and at least one of the upper boundary target density and the lower boundary target density; and
   calculating a lower boundary emulsion phase elevation from said density readings, and at least one of the upper boundary target density and the lower boundary target density,
wherein the lower boundary emulsion phase elevation is calculated by:
   identifying an above target density source-detector pair from the plurality of source-detector pairs, the above target density source-detector pair producing an above target density reading that is the density reading from the plurality of source-detector pairs that is closest in value or equal to, but is not more than, the lower boundary target density;
   identifying a below target density source-detector pair from the plurality of source-detector pairs, the below target density source-detector pair producing a below target density reading that is the density reading from the plurality of source-detector pairs that is closest in value or equal to, but is not less than, the lower boundary target density;
   calculating a percentage offset, the percentage offset defined as the ratio between (1) and (2), where (1) is the difference between the lower boundary target density and the above target density reading and (2) is the difference between the below target density reading and the above target density reading;
   multiplying the percentage offset by the difference between the elevation of the above target density source-detector pair and the elevation of the below target density source-detector pair; and
   adding the elevation of the below target density source-detector pair to the product of the multiplication.

3. A system for determining the elevation of an emulsion phase in a vessel that contains a first matter phase and a second matter phase, the system comprising:
   a plurality of source-detector pairs operatively connected to the vessel, each of the source-detector pairs comprising a radioactive source and a radiometric detector, wherein each of the source-detector pairs is positioned at an elevation measured from the bottom of the vessel;
   a computing device communicatively coupled to the plurality of source-detector pairs, the computing device configured to identify the height of an emulsion phase using an upper boundary target density and a lower boundary target density by the steps of:
      obtaining density readings from at least two of the source-detector pairs;
      calculating an upper boundary emulsion phase elevation from said density readings, and at least one of the upper boundary target density and the lower boundary target density; and
      calculating a lower boundary emulsion phase elevation from said density readings, and at least one of the upper boundary target density and the lower boundary target density,
   wherein the upper boundary target density and the lower boundary target density are automatically calculated, and
   wherein the upper boundary target density is calculated by:
      identifying the uppermost of the plurality of the source-detector pairs;
      identifying the lowermost of the plurality of the source-detector pairs;
      multiplying the difference between the density reading of the uppermost of the plurality of source-detector pairs and the density reading of the lowermost of the plurality of source-detector pairs by an upper boundary offset percentage; and
      adding the product of the multiplication to the density reading of the uppermost of the plurality of source-detector pairs.

4. The system of claim 3, wherein the upper boundary offset percentage is from 1% to 50%.

5. A system for determining the elevation of an emulsion phase in a vessel that contains a first matter phase and a second matter phase, the system comprising:
   a plurality of source-detector pairs operatively connected to the vessel, each of the source-detector pairs comprising a radioactive source and a radiometric detector, wherein each of the source-detector pairs is positioned at an elevation measured from the bottom of the vessel;
   a computing device communicatively coupled to the plurality of source-detector pairs, the computing device configured to identify the height of an emulsion phase using an upper boundary target density and a lower boundary target density by the steps of:
      obtaining density readings from at least two of the source-detector pairs;
      calculating an upper boundary emulsion phase elevation from said density readings, and at least one of the upper boundary target density and the lower boundary target density; and
      calculating a lower boundary emulsion phase elevation from said density readings, and at least one of the upper boundary target density and the lower boundary target density,
   wherein the upper boundary target density and the lower boundary target density are automatically calculated, and
   wherein the lower boundary target density is calculated by:
      identifying the uppermost of the plurality of the source-detector pairs;
      identifying the lowermost of the plurality of the source-detector pairs;
      multiplying the difference between the density reading of the uppermost of the plurality of source-detector pairs and the density reading of the lowermost of the plurality of source-detector pairs by a lower boundary offset percentage; and
      subtracting the product of the multiplication from the density reading of the lowermost of the plurality of source-detector pairs.

6. The system of claim 5, wherein the lower boundary offset percentage is from 1% to 50%.

7. A system for determining the elevation of an emulsion phase in a vessel that contains a first matter phase and a second matter phase, the system comprising:
   a plurality of source-detector pairs operatively connected to the vessel, each of the source-detector pairs comprising a radioactive source and a radiometric detector, wherein each of the source-detector pairs is positioned at an elevation measured from the bottom of the vessel;
   a computing device communicatively coupled to the plurality of source-detector pairs, the computing device configured to identify the height of an emulsion phase using an upper boundary target density and a lower boundary target density by the steps of:
  obtaining density readings from at least two of the source-detector pairs;
  calculating an upper boundary emulsion phase elevation from said density readings, and at least one of the upper boundary target density and the lower boundary target density; and
  calculating a lower boundary emulsion phase elevation from said density readings, and at least one of the upper boundary target density and the lower boundary target density,
further comprising a plurality of relay outputs configured to alarm for a plurality of alarming conditions.

8. The system of claim 7, wherein the computing device is further configured to process one or more level measurement signals from the vessel.

9. The system of claim 8, wherein the one or more level measurement signals comprise:
  a measurement of a solid thickness at the bottom of the vessel; and
  a measurement of a liquid/gas phase interface elevation at the top of the vessel.

10. The system of claim 7, wherein the computing device is further configured to:
  calculate the thickness of the emulsion phase;
  calculate the average height of a water phase, the water phase being one of the first matter phase and the second matter phase; and
  calculate the concentration of water in the vessel.

11. The system of claim 7, wherein the plurality of alarming conditions include electromagnetic radiation interference, a communication fault, and a radiometric detector fault.

12. A method for determining the elevation of an emulsion phase in a vessel that contains a first matter phase and a second matter phase, the method comprising:
  obtaining density readings from at least two of a plurality of source-detector pairs, each of the source-detector pairs comprising a radioactive source and a radiometric detector, wherein each of the source-detector pairs is positioned at an elevation measured from the bottom of the vessel;
  calculating an upper boundary emulsion phase elevation from said density readings, and at least one of an upper boundary target density and a lower boundary target density; and
  calculating a lower boundary emulsion phase elevation from said density readings, and at least one of the upper boundary target density and the lower boundary target density,
wherein the upper boundary emulsion phase elevation is calculated by:
  identifying an above target density source-detector pair from the plurality of source-detector pairs, the above target density source-detector pair producing an above target density reading that is the density reading from the plurality of source-detector pairs that is closest in value or equal to, but is not more than, the upper boundary target density;
  identifying a below target density source-detector pair from the plurality of source-detector pairs, the below target density source-detector pair producing a below target density reading that is the density reading from the plurality of source-detector pairs that is closest in value or equal to, but is not less than, the upper boundary target density;
  calculating a percentage offset, the percentage offset defined as the ratio between (1) and (2), where (1) is the difference between the upper boundary target density and the above target density reading and (2) is the difference between the below target density reading and the above target density reading;
  multiplying the percentage offset by the difference between the elevation of the above target density source-detector pair and the elevation of the below target density source-detector pair; and
  adding the elevation of the below target density source-detector pair to the product of the multiplication.

13. A method for determining the elevation of an emulsion phase in a vessel that contains a first matter phase and a second matter phase, the method comprising:
  obtaining density readings from at least two of a plurality of source-detector pairs, each of the source-detector pairs comprising a radioactive source and a radiometric detector, wherein each of the source-detector pairs is positioned at an elevation measured from the bottom of the vessel;
  calculating an upper boundary emulsion phase elevation from said density readings, and at least one of an upper boundary target density and a lower boundary target density; and
  calculating a lower boundary emulsion phase elevation from said density readings, and at least one of the upper boundary target density and the lower boundary target density,
wherein the lower boundary emulsion phase elevation is calculated by:
  identifying an above target density source-detector pair from the plurality of source-detector pairs, the above target density source-detector pair producing an above target density reading that is the density reading from the plurality of source-detector pairs that is closest in value or equal to, but is not more than, the lower boundary target density;
  identifying a below target density source-detector pair from the plurality of source-detector pairs, the below target density source-detector pair producing a below target density reading that is the density reading from the plurality of source-detector pairs that is closest in value or equal to, but is not less than, the lower boundary target density;
  calculating a percentage offset, the percentage offset defined as the ratio between (1) and (2), where (1) is the difference between the lower boundary target density and the above target density reading and (2) is the difference between the below target density reading and the above target density reading;
  multiplying the percentage offset by the difference between the elevation of the above target density source-detector pair and the elevation of the below target density source-detector pair; and
  adding the elevation of the below target density source-detector pair to the product of the multiplication.

14. A method for determining the elevation of an emulsion phase in a vessel that contains a first matter phase and a second matter phase, the method comprising:
  obtaining density readings from at least two of a plurality of source-detector pairs, each of the source-detector pairs comprising a radioactive source and a radiometric detector, wherein each of the source-detector pairs is positioned at an elevation measured from the bottom of the vessel;

calculating an upper boundary emulsion phase elevation from said density readings, and at least one of an upper boundary target density and a lower boundary target density; and calculating a lower boundary emulsion phase elevation from said density readings, and at least one of the upper boundary target density and the lower boundary target density, wherein the upper boundary target density and the lower boundary target density are automatically calculated, and wherein the upper boundary target density is calculated by:

identifying the uppermost of the plurality of the source-detector pairs;

identifying the lowermost of the plurality of the source-detector pairs;

multiplying the difference between the density reading of the uppermost of the plurality of source-detector pairs and the density reading of the lowermost of the plurality of source-detector pairs by an upper boundary offset percentage; and adding the product of the multiplication to the density reading of the uppermost of the plurality of source-detector pairs.

15. The method of claim 14, wherein the upper boundary offset percentage is from 1% to 50%.

16. A method for determining the elevation of an emulsion phase in a vessel that contains a first matter phase and a second matter phase, the method comprising:

obtaining density readings from at least two of a plurality of source-detector pairs, each of the source-detector pairs comprising a radioactive source and a radiometric detector, wherein each of the source-detector pairs is positioned at an elevation measured from the bottom of the vessel;

calculating an upper boundary emulsion phase elevation from said density readings, and at least one of an upper boundary target density and a lower boundary target density; and calculating a lower boundary emulsion phase elevation from said density readings, and at least one of the upper boundary target density and the lower boundary target density, wherein the upper boundary target density and the lower boundary target density are automatically calculated, and wherein the lower boundary target density is calculated by:

identifying the uppermost of the plurality of the source-detector pairs;

identifying the lowermost of the plurality of the source-detector pairs;

multiplying the difference between the density reading of the uppermost of the plurality of source-detector pairs and the density reading of the lowermost of the plurality of source-detector pairs by a lower boundary offset percentage; and subtracting the product of the multiplication from the density reading of the lowermost of the plurality of source-detector pairs.

17. The method of claim 16, wherein the lower boundary offset percentage is from 1% to 50%.

* * * * *